(12) United States Patent
Leach et al.

(10) Patent No.: US 6,656,563 B1
(45) Date of Patent: Dec. 2, 2003

(54) SEGMENTED SEPARABLE FASTENER

(75) Inventors: Peter E. Leach, Hooksett, NH (US); Christopher M. Gallant, Nottingham, NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 09/576,831

(22) Filed: May 23, 2000

(51) Int. Cl.$^7$ ............... B32B 3/06; B32B 7/00; A44B 1/04; A44B 11/25; A44B 17/00

(52) U.S. Cl. ............ 428/100; 428/120; 24/442; 24/443; 24/447; 24/450

(58) Field of Search .............. 24/452, 306, 442, 24/443, 444, 447, 450; 428/99, 100, 120, 192, 35.7

(56) References Cited

U.S. PATENT DOCUMENTS

| | | | |
|---|---|---|---|
| 3,752,619 A | 8/1973 | Menzin et al. | 425/134 |
| 4,563,380 A | 1/1986 | Black et al. | 428/100 |
| 4,592,118 A | 6/1986 | DeWoskin | 24/444 |
| 4,617,214 A | 10/1986 | Billarant | 428/40 |
| 4,673,542 A | 6/1987 | Wigner et al. | 264/46.7 |
| 4,693,921 A | 9/1987 | Billarant et al. | 428/100 |
| 4,710,414 A | 12/1987 | Northrup et al. | 428/43 |
| 4,726,975 A | 2/1988 | Hatch | 428/100 |
| 4,732,631 A | 3/1988 | Shimizu | 156/73.3 |
| 4,784,890 A | 11/1988 | Black | 428/100 |
| 4,794,028 A | 12/1988 | Fischer | 428/100 |
| 4,842,916 A | 6/1989 | Ogawa et al. | 428/100 |
| 4,881,997 A | 11/1989 | Hatch | 156/66 |
| 4,931,344 A | 6/1990 | Ogawa et al. | 428/100 |
| 4,933,224 A | 6/1990 | Hatch | 428/100 |
| 4,951,408 A | 8/1990 | Banks | |
| 5,058,245 A | 10/1991 | Saito | 24/306 |
| 5,061,540 A | 10/1991 | Cripps et al. | 428/100 |
| 5,110,649 A | 5/1992 | Morse et al. | 428/100 |
| 5,171,395 A | 12/1992 | Gilcreast | 156/500 |
| 5,180,618 A | 1/1993 | Kessler et al. | 428/100 |
| 5,259,905 A | 11/1993 | Gilcreast | 156/250 |
| 5,260,015 A | 11/1993 | Kennedy et al. | 264/167 |
| 5,286,431 A | 2/1994 | Banfield et al. | 264/134 |
| 5,422,156 A | 6/1995 | Billarant | 428/100 |
| 5,500,268 A | 3/1996 | Billarant | 428/100 |
| 5,540,970 A * | 7/1996 | Banfield et al. | 428/100 |
| 5,579,562 A | 12/1996 | Hattori et al. | |
| 5,606,781 A | 3/1997 | Provost et al. | 24/452 |
| 5,665,449 A | 9/1997 | Billarant | 428/100 |
| 5,688,576 A | 11/1997 | Ohno et al. | 428/100 |
| 5,725,928 A | 3/1998 | Kenney et al. | 428/100 |
| 5,736,217 A | 4/1998 | Banfield et al. | 428/100 |
| 5,766,723 A | 6/1998 | Oborny et al. | |
| 5,786,061 A * | 7/1998 | Banfield | 428/100 |
| 6,463,635 B2 * | 10/2002 | Murasaki | 24/452 |

FOREIGN PATENT DOCUMENTS

| | | | |
|---|---|---|---|
| EP | 0138724 A2 | 4/1985 | |
| FR | 2423666 | 11/1979 | |
| FR | 2609758 | 7/1988 | |
| JP | 2788564 | * 8/1998 | ........... A44B/18/00 |
| WO | WO 86/03164 | 6/1986 | |
| WO | WO 96/25064 | 8/1996 | |
| WO | WO 98/02331 | 1/1998 | |

* cited by examiner

*Primary Examiner*—Harold Pyon
*Assistant Examiner*—Michael C. Miggins
(74) *Attorney, Agent, or Firm*—Steven J. Weissburg

(57) ABSTRACT

A segmented hook and loop type fastener accommodates molding contours. Each segment may be surrounded by a gasket barrier, or covered, or unprotected. On the fastening face of a base member are a plurality of fastening elements, either hook-type or loop-type. Between and joining each adjacent pair of fastening segments is a flexible neck that is narrower than the fastening segment. The flexible neck region is typically flexible around two or three orthogonal axes. Each segment may have a barrier for use during an operation to incorporate the fastener into a molded body. The barrier would prevent any liquid foaming material from contacting the fastening elements if the fastener is placed in the mold with the fastening elements pressed against the wall of the mold. The cover may be enveloping or space filling. Several different types of apparatus and methods for fabricating such a fastener are also disclosed.

21 Claims, 14 Drawing Sheets

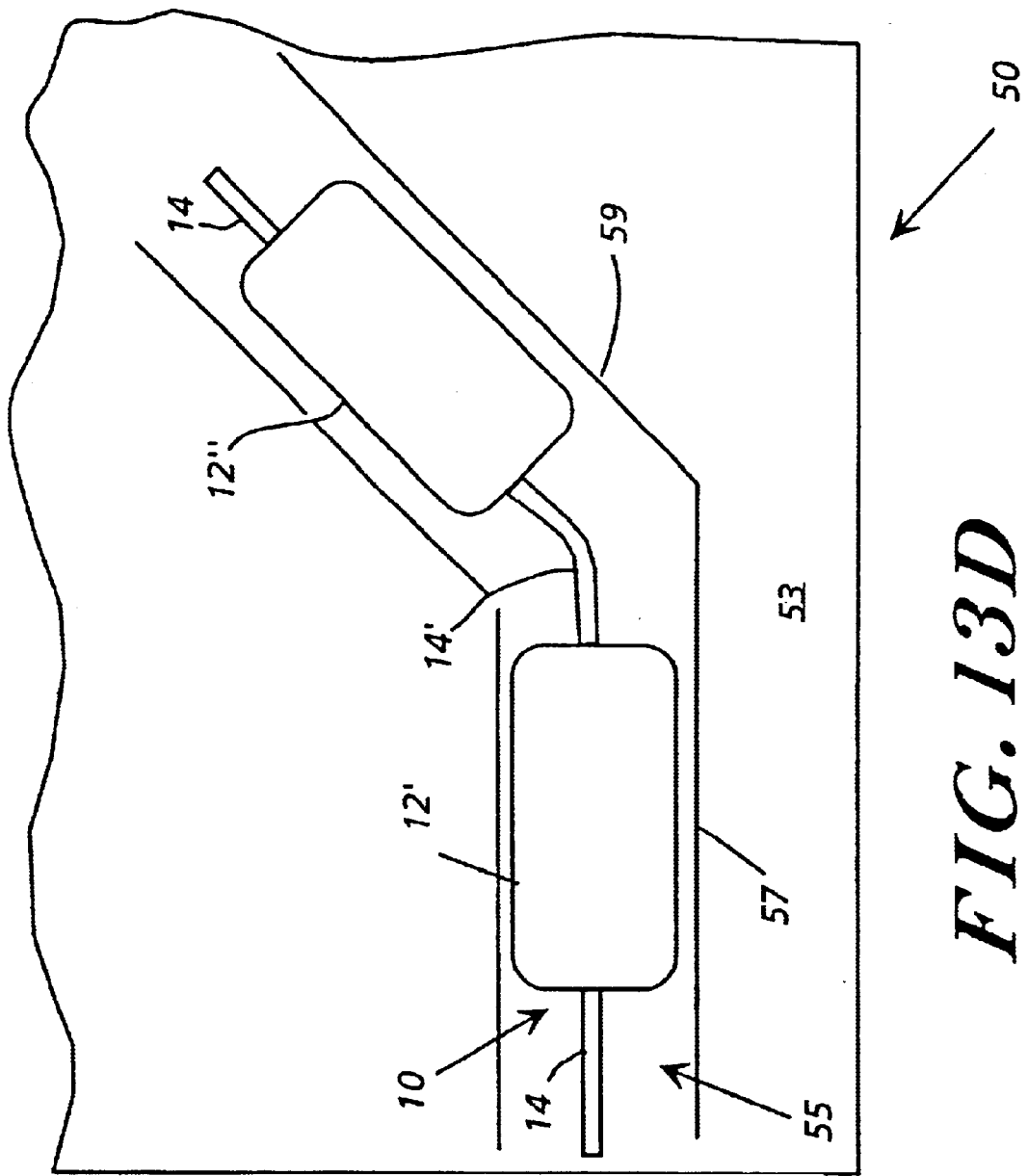

SEGMENTED SEPARABLE FASTENER

BACKGROUND

This invention relates to separable fasteners, in general, and, in specific, to separable fasteners that will be attached to a molded article, such as a seat cushion.

One portion of such a separable fastener is typically incorporated into the molded object, such as a polyurethane seating foam, during a molding process, for subsequent attachment to another object carrying the mating portion of the separable fastener. The fastener of this invention greatly simplifies the method of molding the part to which it is attached. Although particular reference is made herein to elastomeric polyurethane foam or hard plastic parts, it is to be understood that a fastener product according to this invention can be used in parts made from a wide variety of materials, e.g. thermoplastic materials, thermoset materials, elastomers, or any other moldable composition.

Hook and loop separable fasteners, such as those sold by the assignee of this invention under the trademarks "VELCRO" and "ULTRAMATE," are well known and used to join two members detachably to each other. This type of fastener has two components. Each has a flexible substrate or base having one component of the fastening system on the surface thereof. One surface typically carries resilient hooks while the other carries loops. When the two surfaces are pressed together they interlock to form a releasable engagement.

The hooks can be any of a variety of shapes, including cane-shaped, palm tree-shaped and mushroom-shaped, all of which are well known within the art. As used within this application, the terms "hook," "hook-type" and "hook-like" shall be construed to mean any such configuration of loop-engaging element.

Separable fasteners are used in the manufacture of automobile seats in the attachment of an upholstered seat cover, ("trim cover"), to a polyurethane foam bun. One portion of the separable fastener is incorporated into the surface of the polyurethane seat bun during the foam molding process. The mating portion of the separable fastener is attached to the seat cover to provide releasable attachment to the foam seat bun. The separable fastener assembly used in the foam mold for incorporation in the bun surface typically is the hooked portion of the separable fastener system. This hook portion has a base carrying resilient hooks on one surface. The surface of the base obverse of the hook-carrying surface may act as an anchoring surface by a variety of configurations well known in the art.

In some assemblies a magnetically attractive material is attached to the base to facilitate placement of the assembly in a trough of the mold cavity wall, which is equipped with magnets. It is also possible to incorporate magnetically attractive material into the body of the fastener itself, such as in a plastic material that is used to make the fastener. This is described in detail in U.S. Pat. No. 5,725,928, issued on Mar. 10, 1998, entitled TOUCH FASTENER WITH MAGNETIC ATTRACTANT, assigned to Velcro Industries B.V., inventors, Brian J. Routhier, Randall B. Kenney and Martin I. Jacobs, the disclosure of which is hereby incorporated herein by reference.

Such fastening devices are applied to one surface of a clamshell mold; a chemical mixture, for instance of a diisocyanate and a polyol, is injected into a mold; the upper surface of the mold is closed and clamped shut while the chemicals react and blow to form a flexible foam, well known in the art.

A protective layer, often in the form of a thin plastic film, may be placed over the resilient hooks (before they are placed in the mold) to prevent incursion of foam into the hooks during the molding process. Significant foam contamination of the hooks would diminish their ability to engage with the mating portion of the fastener.

Prior-art assemblies, including those disclosed in U.S. Pat. No. 4,673,542, inventor Wigner et al., U.S. Pat. No. 4,563,380, inventor Black et al., and U.S. Pat. No. 4,693,921, inventor Billarant et al., employ a thin, enveloping film to prevent the incursion of foam into the fastener elements of the separable fastener during molding. French Patent 2,423,666 discloses a system for sealing the edges of the tape in the mold trough by jamming the edges of the fastener into the trough.

Two patents, which are assigned to the assignee hereof, disclose another arrangement for protecting the fastening elements from degradation and fouling by the foaming material. U.S. Pat. No. 5,286,431, issued on Feb. 15, 1994, to Banfield and Rocha, entitled MOLDED PRODUCT HAVING INSERT MOLD-IN FASTENER, discloses a fastener of the hook and loop type having a base member and a plurality of engaging elements upstanding from one surface thereof. A flexible (e.g. elastomeric or rubber) encasement (which may be either thermoplastic or thermoset) that intimately surrounds the individual engaging elements, substantially filling all of the space around each one, protects the elements when they are exposed to the harsh environment of a molding process. The fastener is placed in a mold and molded into, as an integral part thereof, a molded part. The encasement is removable from the engaging elements after the molding process, to expose the engaging elements, without permanently deforming or substantially destroying the fastening performance thereof. U. S. Pat. No. 5,540,970, issued on Jul. 30, 1996 to Banfield et al., entitled DIE CUT MOLD-IN, further discloses providing the flexible cover so that the tips of the hooks are slightly exposed. Other modifications of the invention are shown in the '970 patent as well. The disclosures of both of these patents are incorporated fully herein by reference.

All of the arrangements discussed above that entail covering the fastening elements that are to be used to attach the molded product to a trim cover or companion piece, require that the molding operation include a step to remove the protective cover, be it a film-like cover or a space filling, encasing cover. This entails an inconvenience for the molding operator. Further, once removed, the cover is in the possession of the molding operator, who must dispose of it. But, the molding operator is not the one who could reuse the cover, even if it were to be recyclable. (It is the fastener manufacturer who is in the best position to reuse the cover.) Thus, from the perspective of the molding operator, it is very beneficial to be able to use a fastening component that does not require a removable cover. Consequently, those whose business it is to make the fastening component to be incorporated into the molded article are interested in providing to the molding operator a component that does not have a cover that needs to be removed after molding.

It is also typically desirable to avoid any apparatus that can not be used with a conventional mold, having a simple flat bottom trench for placement of the fastening element. Otherwise, the molding operator must alter its normal equipment and way of doing business.

Thus, there are, so called "coverless" products, which protect the fasteners without a separate cover. One such product is described in U.S. Pat. No. 5,606,781, issued on Mar. 4, 1997, entitled, SEPARABLE FASTENER HAVING A BALD PERIMETER RIB BOUNDED BY FASTENING ELEMENTS, also assigned to the assignee hereof, inventors, George Provost, Brian J. Routhier and Martin I. Jacobs. This product has a fastener with a central fastening area of fastening elements, surrounded by a region that has no hooks (into which a mating portion of the mold may fit) which is in turn surrounded by a ring of fastening elements that are "sacrificial," in the sense that they may become fouled with molding material, but they will prevent the incursion of the molding material into the interior, fastening area. The disclosure of this '781 patent is hereby incorporated herein by reference.

U.S. Pat. No. 5,786,061, issued on Jul. 28, 1998, to the present assignee, entitled SEPARABLE FASTENER HAVING A PERIMETER COVER GASKET, inventor Donald Banfield, discloses a fastener having a flexible, space filling cover as described above in connection with either U.S. Pat. Nos. 5,286,431 or 5,540,970, but where the gasket covers only the perimeter hooks, with an internal coverless region. This gasket cover can remain on the fastening element after the molding operation has completed, thereby eliminating the need to dispose of a removed cover.

Other patents that disclose a gasket type approach to this problem are those assigned to Velcro Industries B.V., in the name of Hatch, including, U.S. Pat. No. 4,726,975 and U.S. Pat. No. 4,814,036, which describe a flexible sealing lip that is applied along the elongated marginal edges of a fastening element. Also of interest is U.S. Pat. No. 4,842,916, assigned to Kuraray Company, Ltd., inventor Ogawa, which describe gaskets of fiber, and, in some cases, foam.

Another challenge to using fasteners of the type described above in connection with molded products, foam or otherwise, is that it is often desirable to attach the fastener to a contoured surface, perhaps one that curves through three dimensions. All of the fasteners described above, in their basic configuration, are made as continuous elongated rectangular sheets, which are typically used as is, or stripped into narrower strips, all of which remain basically rectilinear.

Such narrow strips can be bent, relatively easily, through two dimensions, out of the plane of the strip. However, bending in the plane of the strip would result in creasing or puckering, as would bending around two or more axis in three dimensions. Bending is further complicated by some of the covering schemes disclosed above, as bending may cause the cover to buckle or separate from the substrate, and thus to fail for its intended purpose.

It is possible with some, but not all of the designs discussed above, to make large planar sheets and cut any shape desired therefrom. However, this procedure typically results in a relatively high amount of waste material. Further, one is still presented with a basically flat piece of material that must be bent to fit a contoured shape. Another possible solution is to use numerous separate relatively small fasteners, each of which must be separately placed in and fixed to the mold. This is undesireable because it requires significant operator handwork or specialized machinery.

Thus, the several objectives of the invention include to provide a fastener that can be secured to the surface of a molded object having virtually any contour, without requiring special cutting of shapes, or placing separate fasteners, and without significant waste of material, and time. Another objective of the present invention is to provide a fastener that has an integral barrier against foam intrusion, which economically, simply and securely protects the fastening elements from being fouled by foaming material. It is a further objective of the invention to provide both the contour and foam barrier features in the same product, without the solution to one problem limiting the effectiveness of the solution to the other.

SUMMARY

In general, according to the present invention, a segmented fastener is used to accommodate molding contours. Each segment may be surrounded by a gasket barrier, or covered by another sort of cover, or left unprotected.

A preferred embodiment of the invention is a separable fastener component for use with a complementary separable fastener component. The separable fastener component comprises a plurality of fastening segments. Each fastening segment comprises a base member, having a nominal fastening face and a non-fastening face; and carried on the fastening face of the base member, a plurality of fastening elements, either hook-type or loop-type. Located between and joining each adjacent pair of fastening segments is a flexible neck that is narrower than the fastening segment. The flexible neck region is typically flexible around two or three orthogonal axes.

For each of the fastening segments, there may be a barrier for use during an operation to incorporate the fastener into a molded body, using a mold having a wall, which barrier would prevent any liquid foaming material from contacting a major portion of any of the fastening elements if the fastener is placed in the mold with the fastening elements pressed against the wall of the mold. The cover may be an enveloping type, or a space filling type, that substantially fills any spaces among the fastening elements. Or, it may, when used with hook type fastening elements, leave just the tips of the hooks exposed. The space filling cover may comprise an elastomeric, a thermoplastic, or a thermoset. It is typically flexible.

Rather than a cover, there may be, for each segmented fastening region, a gasket that extends fully around the perimeter of the segmented region. The gasket may be a perimeter lip that has been integrally formed with the fastening elements, or that has been applied to the base member separately from the fastening elements. If the fastening elements comprise hook-type elements having free tips, it is beneficial that the gasket comprise a flexible lip that extends away from the base slightly further than the tips. The gasket may comprise a perimeter space filling gasket that covers fastening elements in a perimeter region of the fastening segment.

Alternatively, according to another preferred embodiment, the fastening segments comprise an internal region that carries the fastening elements and a perimeter region that carries no fastening elements, the gasket comprising a perimeter space filling gasket that covers the perimeter region that carries no fastening elements.

The base may comprise magnetically attractable material.

According to still another preferred embodiment, the invention is a method for forming a separable fastener component for use with a complementary separable fastener component. The method comprises the steps of forming a plurality of fastening segments. Each fastening segment comprises a base member, having a nominal fastening face and a non-fastening face; and carried on the fastening face of the base member, a plurality of fastening elements selected from the group consisting of hook-type and loop-type elements. The method further comprises the step of joining each adjacent pair of fastening segments with a flexible neck that is significantly narrower than the fastening segment.

The step of forming a plurality of fastening segments comprise the step of providing, on a mold body, a plurality of spaced apart mold cavities shaped to form the fastening segments and between and joining each of the fastening segment mold cavities, a mold cavity shaped to form the flexible neck. The method also includes providing molding material to the mold cavities under sufficient pressure to force the molding material into the mold cavities; and removing the molding material from the cavities after the material has been formed into the fastening segments connected by the necks, to form the fastener component.

The step of providing molding material may comprise providing molding material to the mold cavities directly through an extrusion nozzle that is closely spaced from the mold cavities.

The mold body may comprise a mold wheel carrying the mold cavities on a peripheral edge. The step of providing molding material may comprise: providing a second wheel with a peripheral edge closely spaced from the mold wheel so as to form a nip therebetween; and providing molding material to the nip such that molding material is forced into the mold cavities under pressure generated at the nip between the molding wheel and the second wheel.

According to another preferred embodiment of the invention, the mold body may comprise a plurality of mold plates having similarly curved arcuate edges that are arranged parallel to each other, the mold cavities being formed in the arcuate edges. The mold plates may be circular, or segments of a circle, where the arcuate edges of the segments comprise a portion of a circle, certain of the mold plates being supported so that they are movable in a radial direction relative to the arcuate edge, thereby facilitating removal of a molded fastener component from the mold cavities, the step of removing molding material from the cavities comprising the step of moving radially inward the movable plates so as to release the molded material.

According to still another embodiment of the invention, the step of providing molding material comprises providing molding material to the mold cavities through an injection mold having at least two parts.

Still another embodiment of the invention contemplates A molded polymeric body, the body comprising an internal body volume; at least one surface; and a separable fastener component, according to any of the embodiments discussed above, adhered to the surface. The fastener component may be arranged such that segments of the fastener component are angled relative to each other, within a plane defined by the base members of the fastening segments.

Yet another embodiment of the invention is a method for forming a molded polymeric body as described above, carrying a segmented, separable fastener component as described above. The method comprises the steps of providing a mold, having at least one surface that has a trench therein, where the trench follows a path that has at least two portions that are angled relative to each other in a plane; and, locating in the trench a separable fastener component as described above. The method further includes providing liquid molding material into the mold such that the molding material substantially covers at least the surface of the mold in which the trench resides, and such that molding material contacts a significant portion of the base member of the fastening component, while simultaneously preventing the liquid molding material from contacting the fastening elements. The molding material is allowed to solidify to form the molded polymeric body, whereby the fastening component is secured to the molded body.

The invention also contemplates, in another embodiment, An apparatus for fabricating a strip of a separable fastening component, as described above. The apparatus comprises a plurality of mold plates, designated a fastener forming zone, having similar arcuate edges. The fastener forming zone further comprises fastening element mold cavities intersecting these edges and one face of the mold plate, the mold cavities being arranged into a plurality of segment forming regions. Circumscribing each of the segment forming regions, is a gasket mold cavity; and between each adjacent pair of segment forming regions, is a hinge forming region. The mold plates are arranged to form a cylindrical mold wheel having a circular surface formed by the arcuate edges of the mold plates such that the segment forming regions are spaced apart circumferentially around the cylindrical surface. The apparatus further comprises an extruder having a die whose surface is disposed close to the cylindrical surface for delivering moldable polymeric material to the mold cavities to form upstanding members and also to the surface to form therewith a polymeric base member strip to which the upstanding members formed in the mold cavities are integrally attached.

Each of the plates may comprise a circular plate. Alternatively, each of the plates may comprise less than an entire circular plate, the apparatus further comprising, for each fastener forming zone, a group of the plurality of plates, the members of the group being arranged with the arcuate edges forming the circular cylindrical surface of the mold wheel. The apparatus may further comprise additional pluralities of fastening plates, each of the additional pluralities comprising another fastener forming zone, the additional pluralities being arranged axially along the circular cylinder mold wheel to form side-by side fastener forming zones.

Still another embodiment of the invention is also an apparatus for fabricating a strip of a separable fastening component, as described above, comprising a plurality of mold plates, designated a fastener forming zone, having similarly curved edges. The mold plates comprise fastening element mold cavities intersecting these edges and one face of the mold plate, the mold cavities being arranged into a plurality of segment forming regions. Circumscribing each of the segment forming regions, a gasket mold cavity; and between each adjacent pair of segment forming regions, is a hinge forming region. The mold plates are arranged to form one component of a multi-piece injection molding assembly having a surface formed by the edges of the mold plates, such that the segment forming regions are spaced apart along the surface. A second component of the injection molding assembly is matable with the surface of the first component. Disposed within at least one of the components of the assembly, are passages for delivering moldable polymeric material to the mold cavities to form upstanding members and also to form therewith a polymeric base member strip to which the upstanding members formed in the mold cavities are integrally attached.

BRIEF DESCRIPTION OF THE FIGURES

These and other features, aspects, and advantages of the present invention will become better understood with regard to the following description, appended claims and accompanying drawings, where:

FIG. 13D is a schematic rendition in top view, similar to FIG. 13A, showing a portion of a fastener of the invention inserted into a mold having a trench that follows a path having two portions that are angled relative to each other;

FIG. 17 is a schematic view, in partial cross-section, of an apparatus for making a fastener of the invention having an extruder head that presents molding material into a nip between two rollers, which generate the required molding pressure there between;

DETAILED DESCRIPTION

Figure 1:
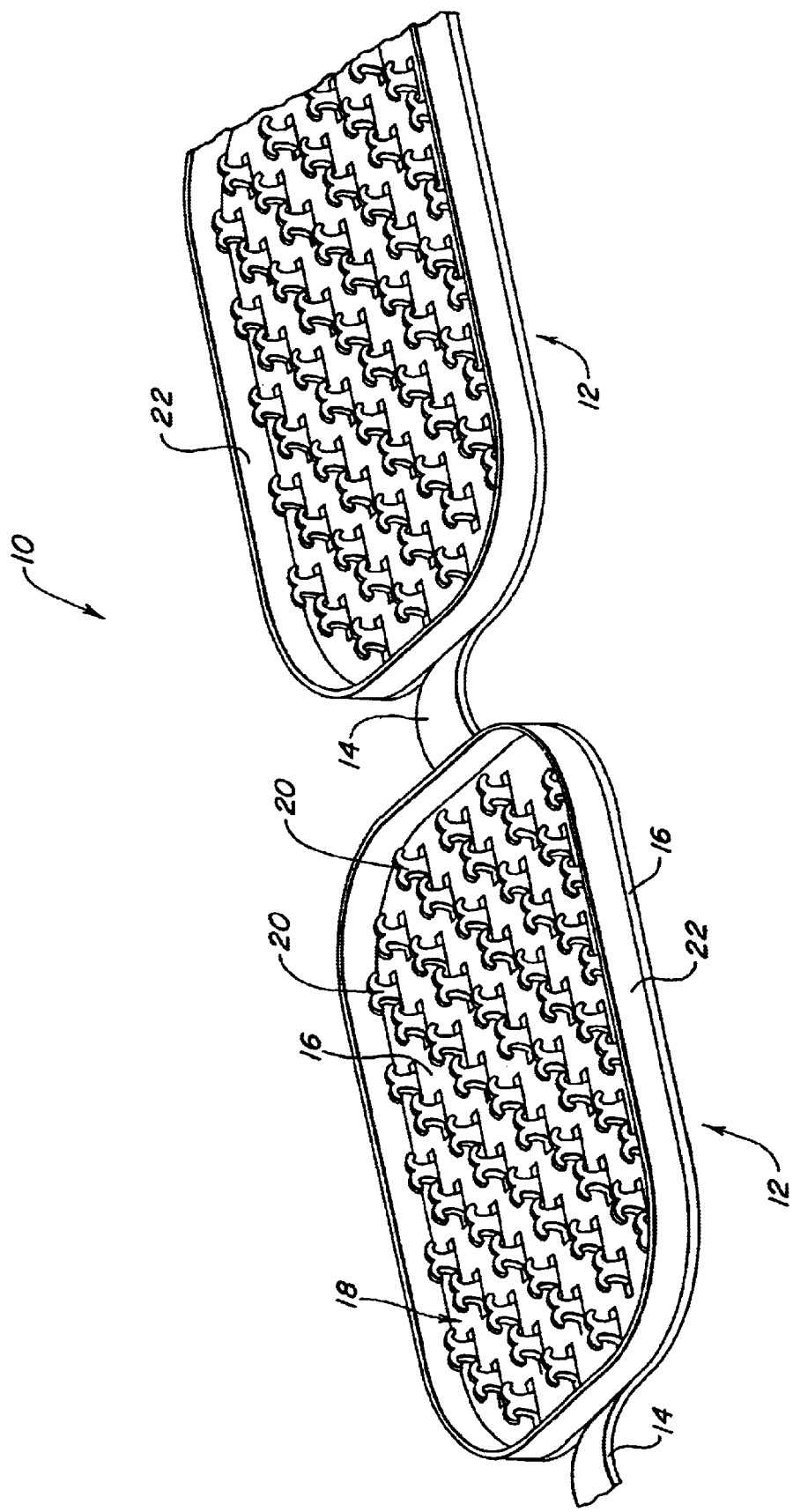
FIG. 1 is a schematic rendition showing a pair of successive segments of a fastener of the invention, in perspective view, the fastener having an integral, molded perimeter gasket and palm-tree type hook elements.
Figure 2:
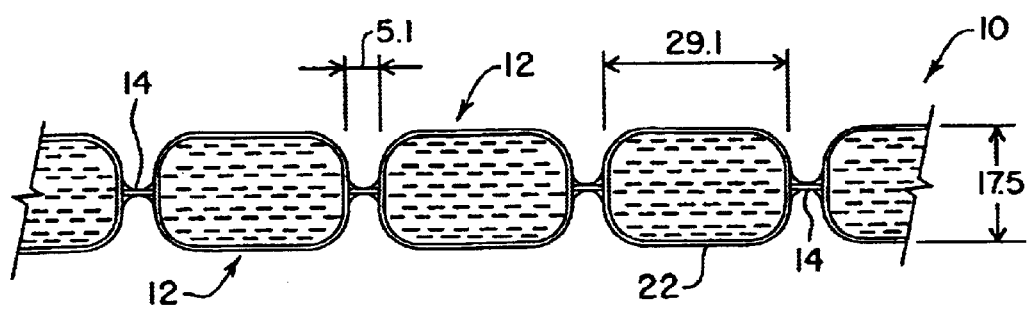
FIG. 2 is a schematic rendition, of a fastener of the invention as shown in FIG. 1, in a plan view.
Figure 3A:
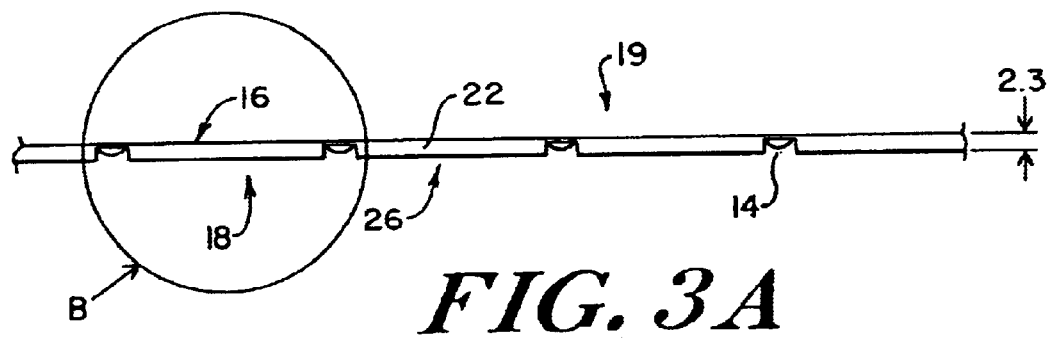
FIG. 3A is a schematic rendition, of a fastener of the invention as shown in FIG. 1, in a side view.
Figure 12:
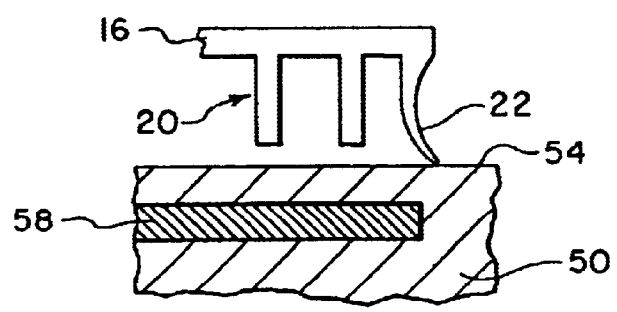
FIG. 12 is a schematic rendition in cross-section of a portion of a fastener, in place in a mold, showing the relative sizes of representative examples of a hooks and a gasket of the invention.

A preferred general embodiment of the invention is shown schematically with reference to FIGS. 1, 2 and 3A, FIG. 1 being a perspective view of a portion of a product, and FIGS. 2 and 3A being plan and side views thereof. An elongated fastener 10 is made up of a series of adjacent fastening segments 12, joined by hinges 14. Each fastening segment 12 includes a base 16, having a fastening face 18 and a non-fastening face (19, shown in FIG. 3A). The base carries a plurality of fastening elements 20 on the fastening face of the hook and loop type fastener. The fastening elements 20 may be hook type elements or loop type elements. The fastening elements shown in FIG. 1 are double hooked palm-tree shaped hook-type elements, but any other type of hook-type or loop type element could be used. A gasket 22 surrounds each segment. The gasket 22 extends slightly further from the base 16 than does the tip of the fastening elements 20, as shown in FIG. 12.

Figure 4A:
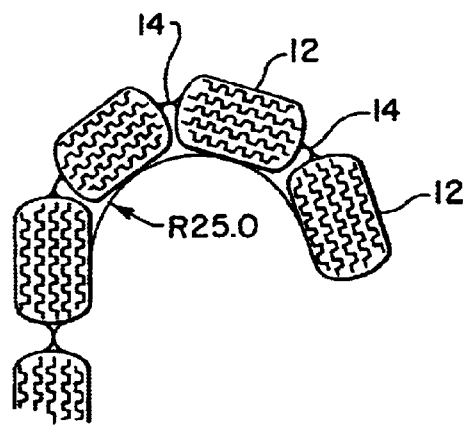
FIG. 4A is a schematic rendition of a fastener, as shown in FIG. 2, bent to show its flexibility in one plane, i.e., the plane of the fastener.
Figure 4B:
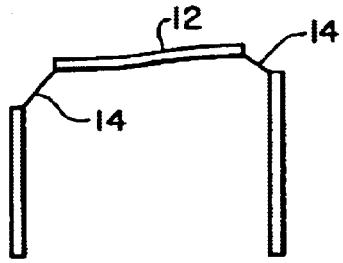
FIG. 4B is a schematic rendition of a fastener, as shown in FIG. 2, bent to show its flexibility out of the plane of the fastener, where the hinges are bent.
Figure 4C:
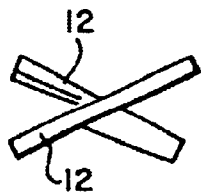
FIG. 4C is a schematic rendition of a fastener, as shown in FIG. 2, bent to show its flexibility out of the plane of the fastener, where the hinges are twisted.

As shown in FIG. 2, the fastener 10 can be a long strip of a large plurality of fastening segments. In a representative embodiment, each segment is twenty-nine mm long, and seventeen mm wide, with the hinges 14 being five mm long. Other sizes are, of course possible. The long strip may be bent at the hinges 14 in many ways. For instance, it can be bent as shown in FIG. 4A, where all of the fastening segments 12 remain essentially in one plane, the plane of the fastener. The minimum bending radius depends predominantly on the relative length of the hinge 14 and the width of the fastening segments. The fastener can also be bent out of the plane of the fastener, around axes that are perpendicular to the long length of the strip of segments, as shown in FIG. 4B. It can also be bent out of the plane of the fastener by twisting a pair of adjacent segments relative to each other around an axis parallel to the long axis, as shown schematically in an end view in FIG. 4C. The fastener can also be bent through any combination of the three modes discussed above.

Figure 10:
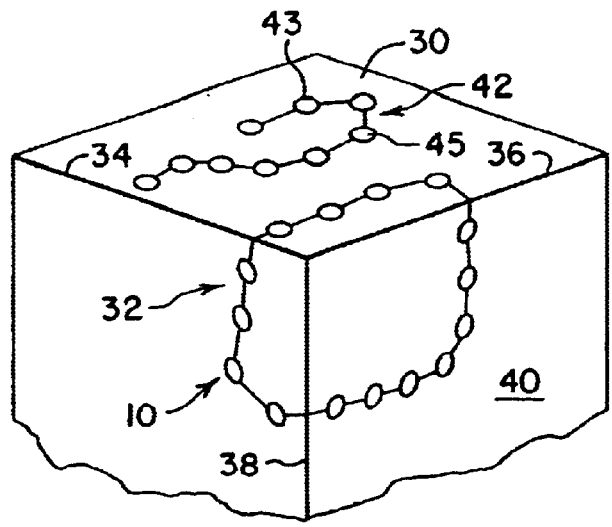
FIG. 10 is a schematic rendition in perspective view of any one of the embodiments of the inventions shown above, molded into a body, passing around three orthogonal corners.

For instance, a tape of fifteen of such fastener segments can be made, which tape can then be secured to a foam block 30 as shown in FIG. 10, around three orthogonal edges 34, 36 and 38. The fastener bends around the edge 34 in the mode shown in FIG. 4B. It bends on block face 40 in the manner shown in FIG. 4A. No twist is shown in FIG. 10. One or more fabric trim covers can then be attached to the corner of the foam block 30. Of course, the fastener can also be made to follow a sinuous path 42 on a single face, which includes at least two portions 43 and 45 that are angled relative to each other within the plane of the base 16 of the fastener segments. The possibilities are virtually limitless.

MOLDED PERIMETER GASKET

Figure 13A:
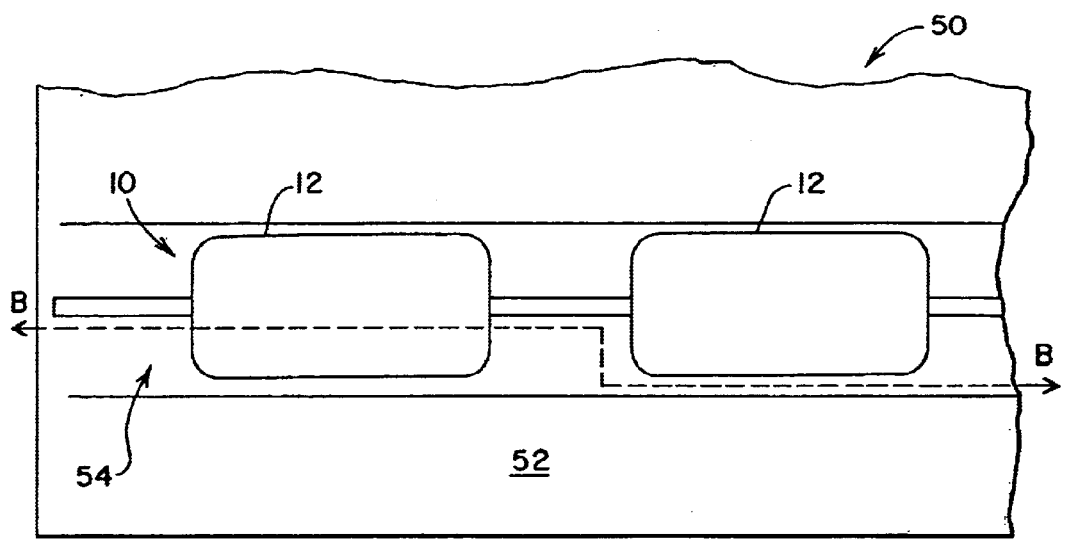
FIGS. 13A and 13B are schematic renditions, in top (FIG. 13A) and side (FIG. 13B) views, showing a portion of a fastener of the invention inserted into a mold, before molding material is provided therein.
Figure 13B:
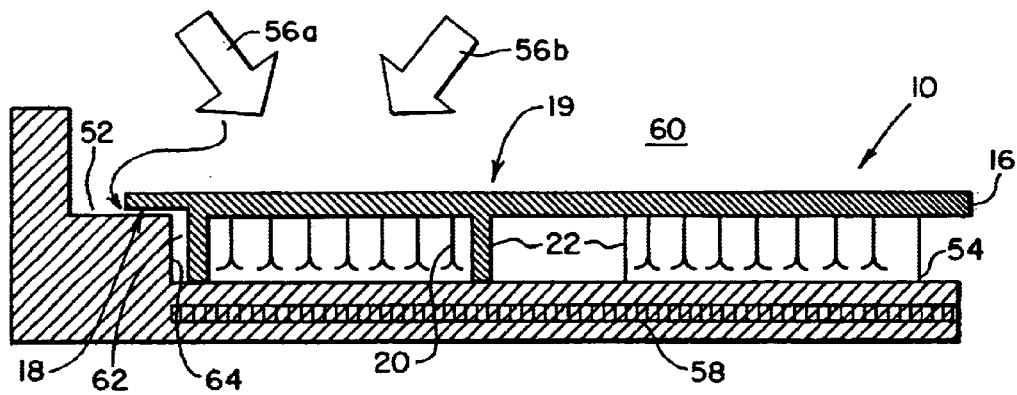
Figure 13C:
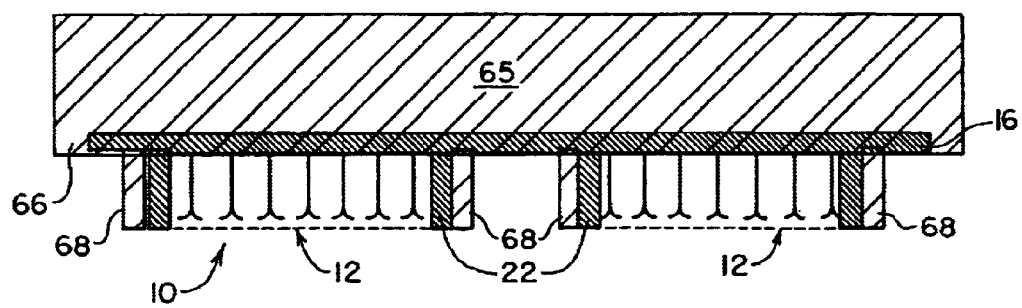
FIG. 13C shows in cross-section a portion of a molded body removed from the mold of FIGS. 13A and 13B, having the fastener attached thereto.

In a preferred embodiment, the fastener has an integrally molded perimeter lip gasket 22, which surrounds the fastening elements 20 to protect them from foam incursion. The means by which the fastening elements 20 are protected is shown schematically with reference to FIGS. 13A, 13B and 13C. FIG. 13A is a top view of a portion of a mold 50, having a bottom wall 52, with a trench 54 formed therein. The trench 54 is sized to accept a fastener strip 10, shown comprised of a plurality of fastener segments 12. This figure is not to scale, and shows only two fastener segments in the portion of the mold shown. In actual practice, there will be a much larger plurality of segments in a much larger mold. As shown in FIG. 13B, which is a cross-section of the portion of the mold shown, cut along the jogged lines B—B, the fastener segments 12 are sized so that the free edge of the gasket 22 contacts the bottom of the trench 54, while the perimeter edges of the fastening face 18 of the base 16 contact the bottom 54 of the mold wall 52 at the edge of the trench. The fastening elements 20 are shorter than the gasket, so they do not touch the bottom of the trench 54. The fastener is drawn tightly toward the trench bottom by a magnet 58, which attracts magnetically attractive material that composes the fastener 10, such as is described in U.S. Pat. No. 5,725,928, identified above. The gasket 22 flexes slightly, as shown enlarged in FIG. 12, and forms a liquid tight seal to protect the fastening elements 20.

Liquid foaming material is poured into the mold cavity 60, such as according to a two component 56a, 56b system, as is well known in the art. Some liquid may tend to leak around the edge of the base 16, into the space 62 between the gasket 22 and the vertical wall 64 of the trench 54. However, due to the presence of the gasket 22, and the magnetic force that attracts it to the trench bottom, the liquid can not get through to the place where the fastening elements are. The foaming material then solidifies, and the entire foam block 65 is removed, having the fastener 10 embedded therein. Using the simple trench 54 shown, the fastening elements and the gasket 22 extend outward from the surface 66 of the foam block 65. There may be small scraps 68 of foam material around the fastening segments, which formed from foam material that leaked into the space 62. However, these areas do not impede fastening the fastening elements 20 to their mates, for instance, hooks 20 to loops on a fabric trim cover.

Figure 3B:
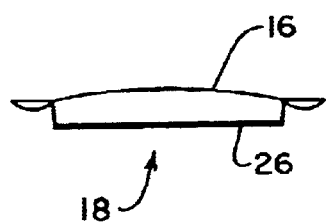
FIG. 3B is a portion B of the fastener shown in FIG. 3A, enlarged.

FIG. 13D is similar to FIG. 13A, and shows schematically, in a top view, a fastener component 10, made up of fastener segments 12, connected to each other by hinges 14, where the fastener component 10 is resting in a trough 55 of a mold 53, where the trough 55 has two portions 57 and 59 that are angled relative to each other, in the plane of the fastener (i.e., a plane defined roughly by the base 16 of the fastening segment, which is only roughly defined, because the base 16 has a slight radius, as shown in FIG. 3B and discussed elsewhere). The hinge 14' that is between the two segments 12 and 12 is bent so that the fastening component can follow the angle in the trough 55. Only one angle is shown, for simplicity. However, a large variety of angles and path patterns could be accomplished, limited primarily by the flexibility of the hinge, and the width of the fastening segments.

Using techniques known in the art, such as ramps, pedestals, etc., it is also possible to have the tips of the fastening elements flush with the surface 66 of the foam block, or submerged, uniformly, or not.

Rather than a foam part, the fastener can also be incorporated into an unfoamed molded part, either thermoplastic or thermoset.

MANUFACTURE OF FASTENER

The molded perimeter gasket, segmented fastener can be made in any suitable way. For instance, the fastener can be made according to the method and apparatus shown generally with reference to U.S. Pat. No. 3,752,619, assigned to Velcro Industries B.V., inventors Menzin, et al. Generally, a large circular cylindrical wheel has hook forming segments distributed around its circumferential edge. The segments are made of ganged together flat plates, with hook forming cavities formed in their edges. When plastic material is forced into the cavities, and thereafter pulled out, hook elements are formed. The hook elements can in some cases be more easily removed, according to the '619 patent, by moving certain of the plate segments radially inward, away from the forming part, thereby freeing the formed hooks. A backing strip may be applied to the formed hooks just downstream of the location where the hooks are formed.

Figure 14:
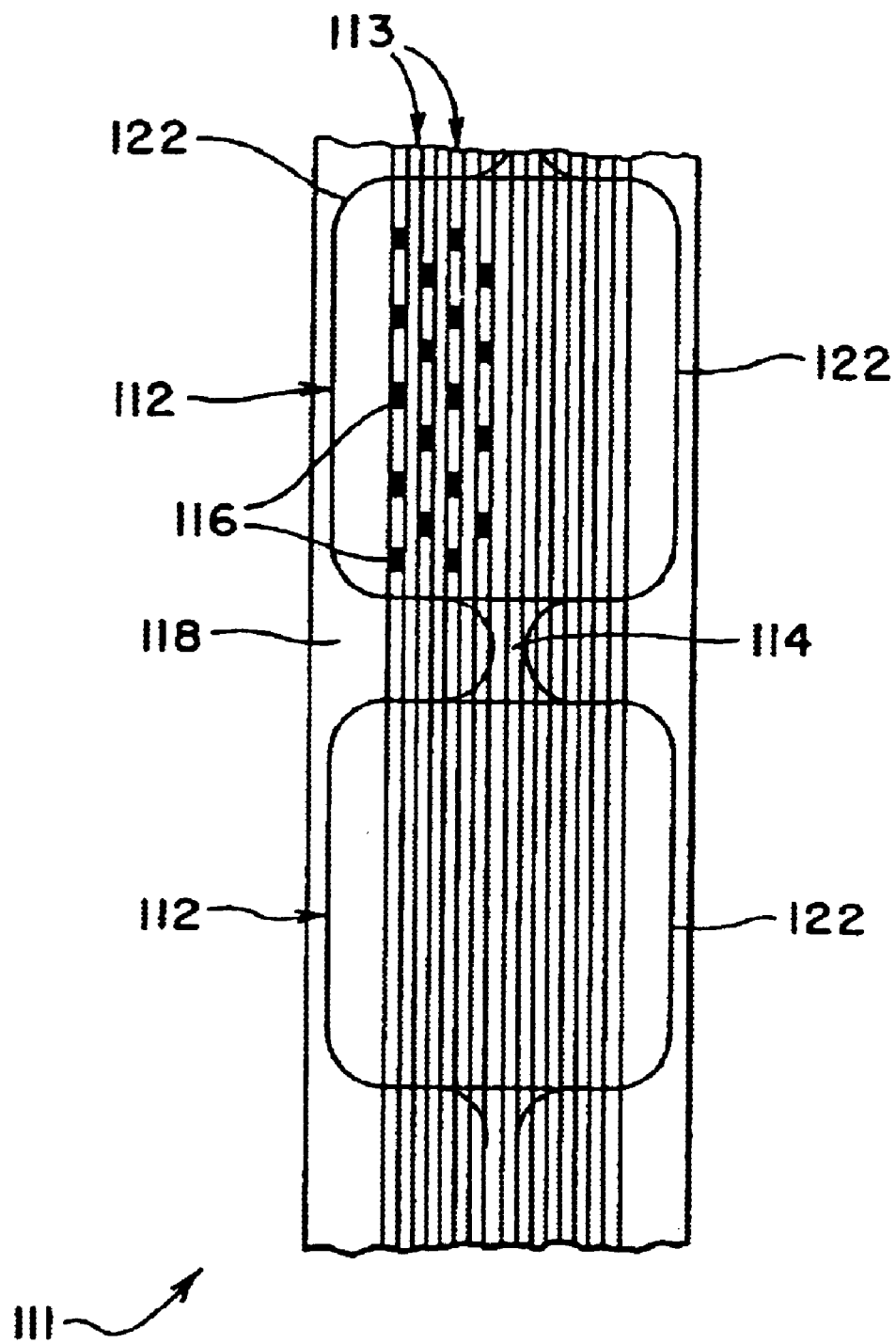
FIG. 14 is a schematic view of two segment forming regions of a part of a fastener forming apparatus of the invention.

A portion of a hook forming wheel, for forming two segments, is shown in FIG. 14. The face shown is the circular, cylindrical circumferential surface of a relatively large wheel. The wheel has a fastener forming zone 111 which includes regions 112 for the formation of, for example, more than fifty such segments. Each region is made up of a plurality of parallel plates 113, some of which have formed therein cavities 116 for the formation of hooks, and some of which may not. There is a region 118 in which no cavities 116 are found, between the regions 112 that form the segments 12. This is the region where the hinge 14 will be formed. A shallow cavity 114 is provided for the hinge to be formed. A gasket forming cavity 122 is formed entirely around the region 112 where the hooks will be formed. This cavity 122 is flat bottomed, to form a flat edge to the gasket 22 that will be formed. The cavity may be formed by plunge electro-discharge machining into the set of plates after they are ganged together.

Figure 15:
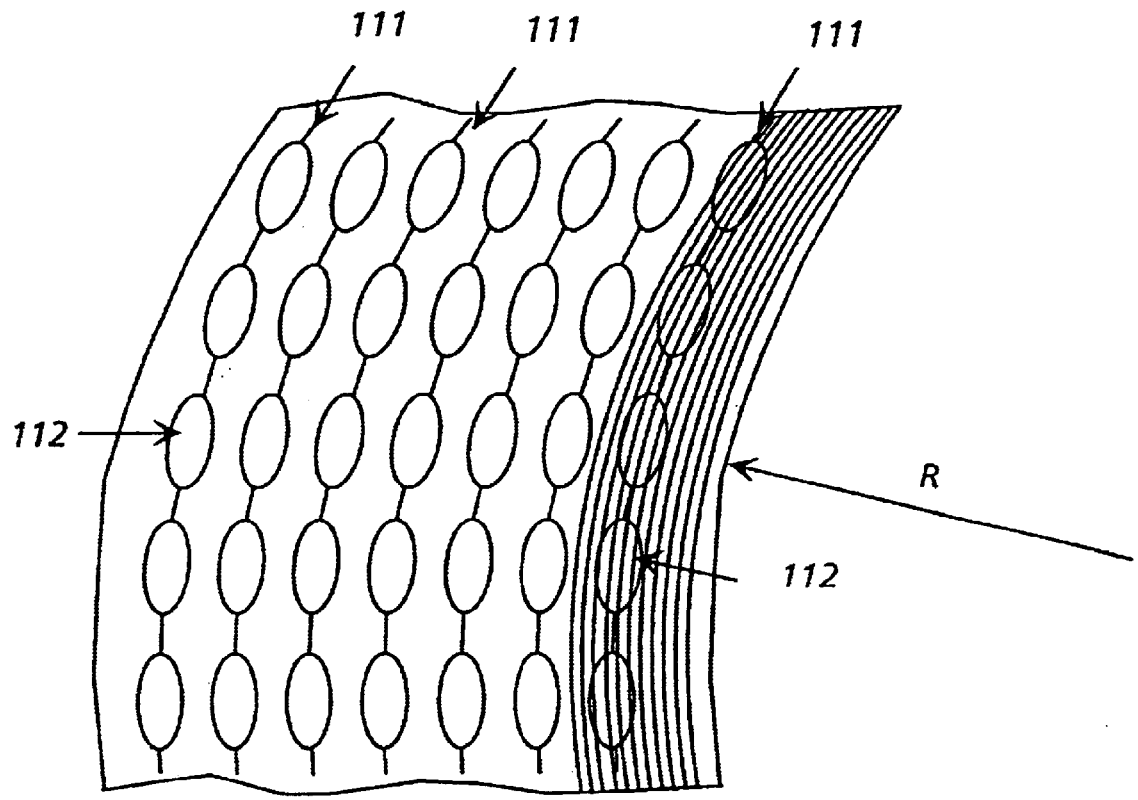
FIG. 15 is a schematic view of a part of seven fastener forming zones of a part of a fastener forming apparatus of the invention.

FIG. 14 shows a two segment portion of one fastener forming zone 111. Wheels can be fabricated with a plurality of such fastener forming zones spaced axially of the cylinder, across the circumferential surface. FIG. 15 shows a portion of such a wheel with seven fastener forming zones 111, each of which showing five fastener segment regions 112 for the formation of a fastener segment. It is typically a goal in designing the tooling to make such components to space the forming regions close to each other, to minimize wasted material, reduce the size of the machinery and its power requirements, etc.

Figure 5:
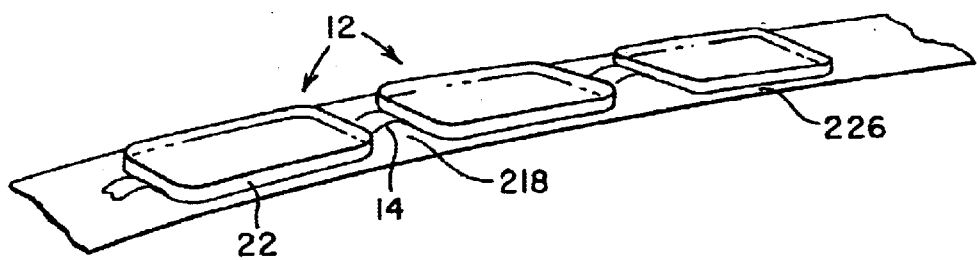
FIG. 5 is a schematic rendition of a precursor to a fastener of the invention, according to some methods of production, showing an intermediate article of manufacture, before the removal of extra material.

A part as formed on such a tool is shown schematically in FIG. 5. The individual segments 12 can be seen, joined to each other by hinges 14, as well as the excess material 218 in the regions between the segments 12. Additional excess material 226 may surround the segments also. This excess material is removed after the strip is removed from the forming wheel.

As shown in FIG. 3B (which is an enlargement of the portion B of FIG. 3A), as a result of being formed on a circular wheel, having a relatively large radius, R (shown in FIG. 15), the base 16 has a slight curve, concave pointing toward the free fastening element tips (downward in FIG. 3B). The free edge 26 of the gasket seal 22 is, however, flat or straight. This is because the bottom of the cavity 122 in which the gasket is formed, is flat.

The segmented fastener can be formed in any suitable way, and other ways are possible. It is also possible to form the fastener strip according to a method and with apparatus described in U.S. Pat. No. 4,794,028, also assigned to Velcro Industries B.V., inventor Fischer. According to the '028 process, hook forming plates similar to those described above are used. However, they are not free to move radially. The hooks are shaped in such a way as to allow their removal from the mold without moving of any plates. In one embodiment discussed in the '028 patent, the molten material is applied at a nip between two rollers, one of which has the hook forming cavities on its circumferential edge, the other of which has none, or, perhaps, anchor forming cavities. Very shortly after the nip, the formed strip is stripped from the backing roller, which may or may not include anchor cavities. The strip remains on the hook forming roller for a portion of a circumference, for instance, between about 20°–270° degrees of arc, at which point it is stripped from the hook forming roller. Thus, the formed hooks have time to cool, and are not likely to be deformed as they are pulled from the cavities, particularly given the shape of the cavities.

The forming roller has the same segment regions 112, hinge regions 114 and gasket cavities 122, as does the forming wheel described above in connection with the '619 patent. Typically, in the '028 process, the wheels are formed from full circular plates that are ganged together, whereas in the '619 process, the plates are annular pie shaped sections, to permit some to move radially inward, for the release of the hooks from the mold.

According to either process, it is possible to make many strips similtaneously, accross the width of the wheel as shown schematically in FIG. 15. For instance, it is typical to make between one and thirty strips or chains at one time. The strips are either individually fabricated (with barriers therebetween on the forming equipment) or are split one from each other after forming.

Figure 16:
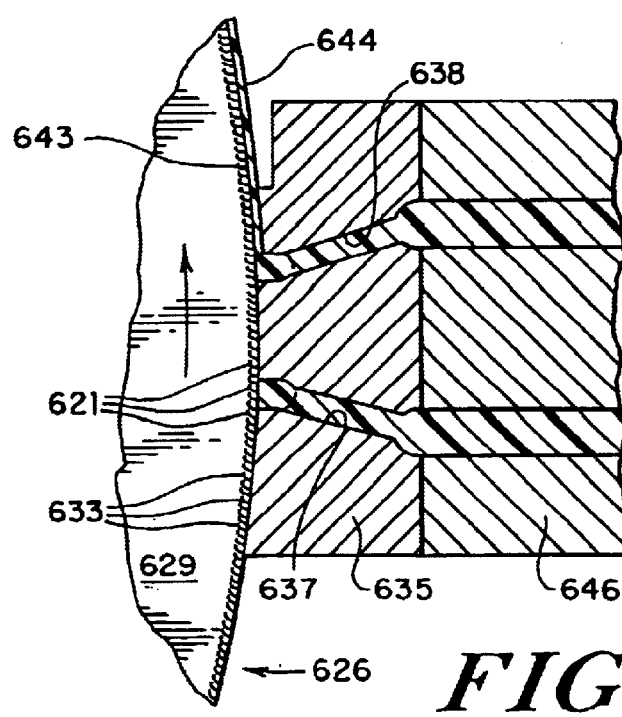
FIG. 16 is a schematic view, in partial cross-section, of an apparatus for making a fastener of the invention having an extruder head that presents molding material directly to a mold wheel under pressure.

The material from which the fastening elements are formed may be presented to the mold in several ways. According to one method, as shown in FIG. 16, an extrusion die 635 of an extruder 646 is placed against the surface of the mold wheel 626. The figure section is cut at the face of one of the plates 629, into which mold cavities are cut. The molding material moves through two passages 637, 638, under significant pressure and temperature conditions, to insure that the molding material is forced completely into the mold cavities 633. FIG. 16 shows two extrusion channels: 637 upstream, from which the hooks 621 are formed, and 638, from which the base member 644 is formed. This extrusion configuration may be used with either the moving plate apparatus disclosed in '619 Menzin patent, or the fixed plate '028 Fischer patent.

Figure 17:
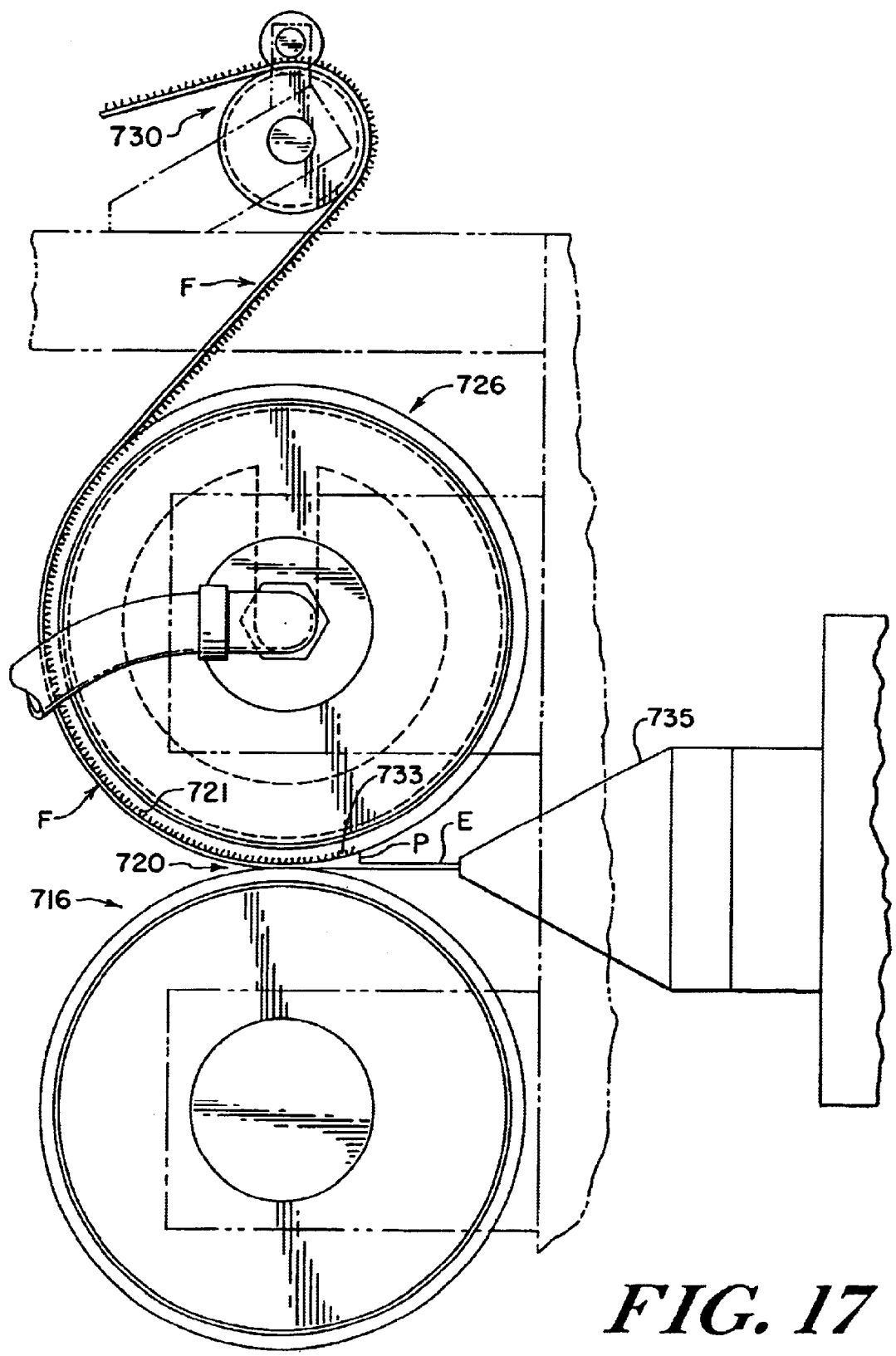

Alternatively, a two roll arrangement can be used, as shown in FIG. 17. A part-forming roll 726, shown above, in FIG. 17, carries the mold cavities 733 for the fastening elements, such as hooks. A lower roll 716 is closely spaced to the upper roll 726. An extrusion head 735 supplies a stream E of molding material to the nip 720 between the two rollers 726 and 716, where pressure is generated to force the molding material into the mold cavities 733, thereby forming the fastening elements 721. The formed strip F of fastening elements remains on the forming roll 726 for some portion of its circumference, about 180° of arc as shown, at which point it is stripped away to pass around another, stripping roller 730.

In this two or more roll embodiment, the upper, part forming roll 726 may be either the moving plate apparatus disclosed in the Menzin '619 patent, or the fixed plate apparatus disclosed in the Fischer '028 patent.

Figure 18:
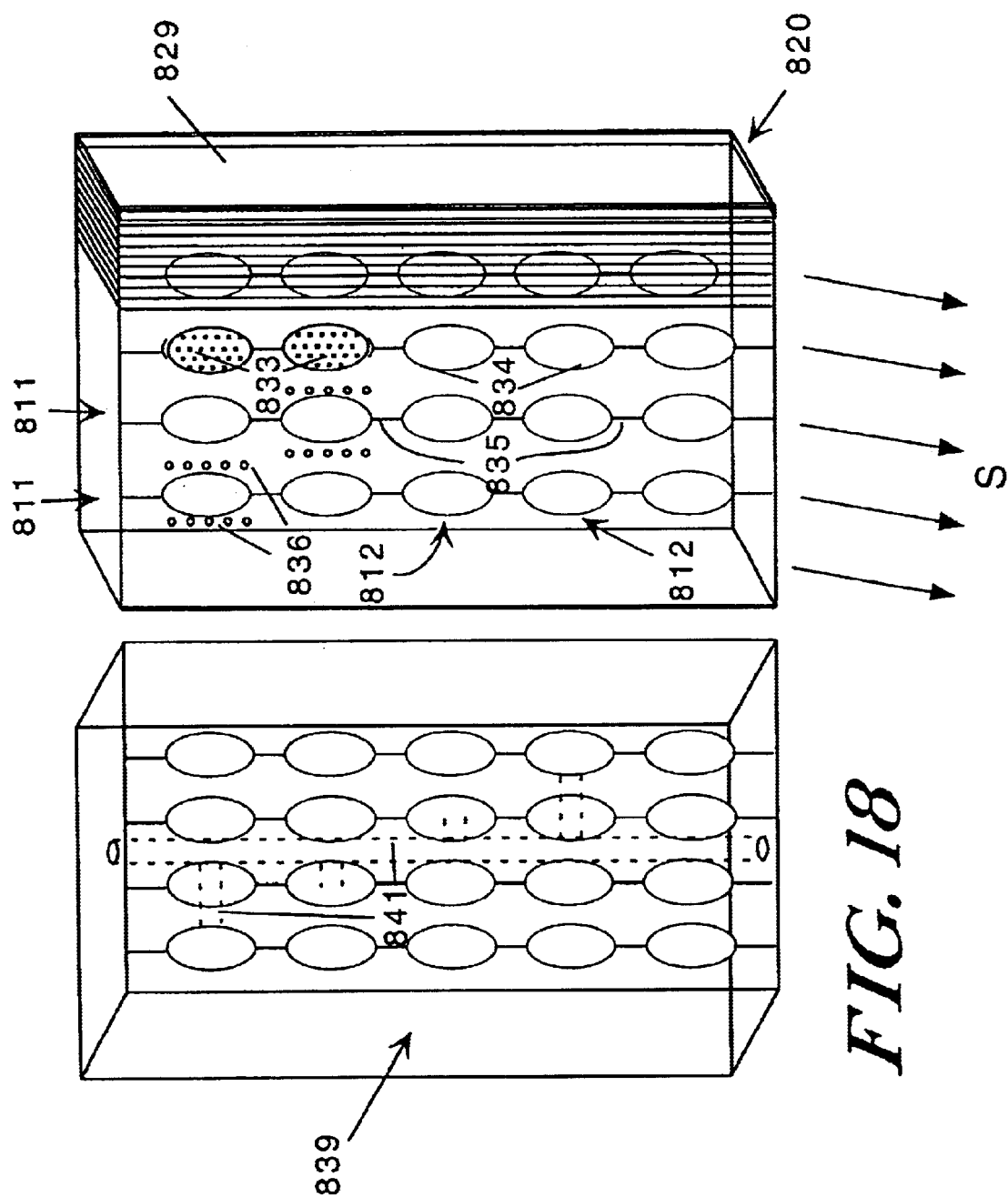
FIG. 18 is a schematic representation of a two part injection mold for fabricating an embodiment of the invention.

The segmented fastener may also be formed using a conventional two (or more) part injection molding apparatus, as shown in FIG. 18. The forming mold 820 has fastener forming zones 811 similar to those on the wheels, described above, which each include five segment forming regions 812. Four fastener forming zones 811 are shown, although there could be more or fewer. Each region is made of plates 829, as above, either movable or not, which have the hook forming cavities 833, the gasket forming cavities 834 and the hinge forming cavities 835 therein. (Only several plates 829 are shown, for clarity. Similarly, hook forming cavities 834 are shown in only two fastener forming zones.) This type of tooling also typically has ejector pins 836 at selected locations around the periphery of the parts to help separate the part from the mold (again, only a few are shown). A mating mold component 839 fits the part forcing component 829, as is conventional, defining the part by their mutual cavities. Multiple pathways 841 (shown in Phantom) through the mold body 839 are provided, through which the molten material is delivered to the segment forming regions 812. The network of pathways 841 shown is schematic only. The pressure source for pressurizing the molten material is not shown. Injection molding apparatus may have more than two moving mold bodies 829 and 839. Only two are shown, again for simplicity.

After each molding cycle, the formed parts are ejected and shuttled in the direction of the arrows S, such that the next shot fastens itself to the previous shot. This forms a continuous chain that may be taken up on a reel.

OTHER TYPES OF SEALS

One advantage of the present invention as described above is the near simultaneous fabrication of the fastening segments, fastening elements and perimeter gasket 22. It is also possible to omit the perimeter gasket 22 or to use, instead, a gasket or a seal or a cover of another type.

Figure 6:
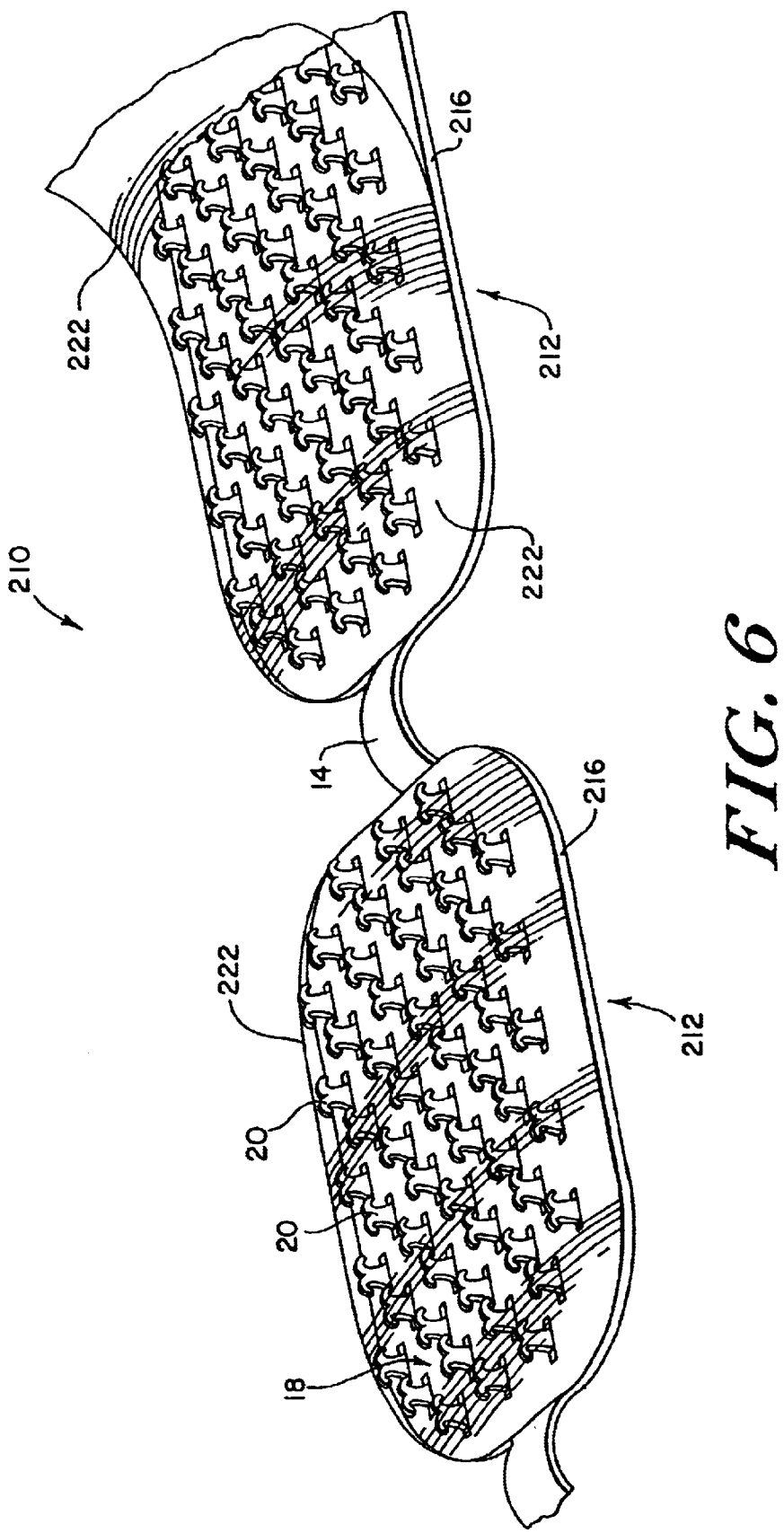
FIG. 6 is a schematic rendition of another embodiment of a fastener of the invention, in perspective view, the fastener having a film-like, enveloping cover, with part of the cover broken away from one of the segments.

For instance, as shown in FIG. 6, a fastening strip 210, with individual fastening segments 212 is provided. This fastening strip is identical to that described above, except that it has no gasket 22 around its perimeter. It has segments 212 that are joined by a hinge 14, which segments and hinge may be formed as described above. The strip has a fastening face 18, which carries fastening elements 20, which are shown in FIG. 6 as hooks, but which can be any fastening element described above. Each segment is individually covered by a film-like cover 222, which seals to the base 216 all around its perimeter, tightly enough to prevent the incursion of foaming material into the region where the fastening elements 20 reside. After the fastening strip has been molded into a foam part, the cover 222 is removed, typically by tearing the seal and ripping off the cover 222.

Similar covers are described in the literature, as applied to larger rectangular shaped fastening components. See for instance U.S. Pat. No. 4,693,921 in the name of Billarant et al.

U.S. Pat. No. 5,766,385, issued on Jun. 16, 1998, in the names of Pollard et al., entitled "Separable Fastener Having Die-Cut Protective Cover with Pull Tab and Method of Making Same" discloses a method of fabricating a fastener with an enveloping cover, of arbitrary shapes. This method can be applied to the segmented covered fastener shown in FIG. 6, and the entire disclosure of the '385 patent is hereby incorporated fully by reference.

Figure 7:
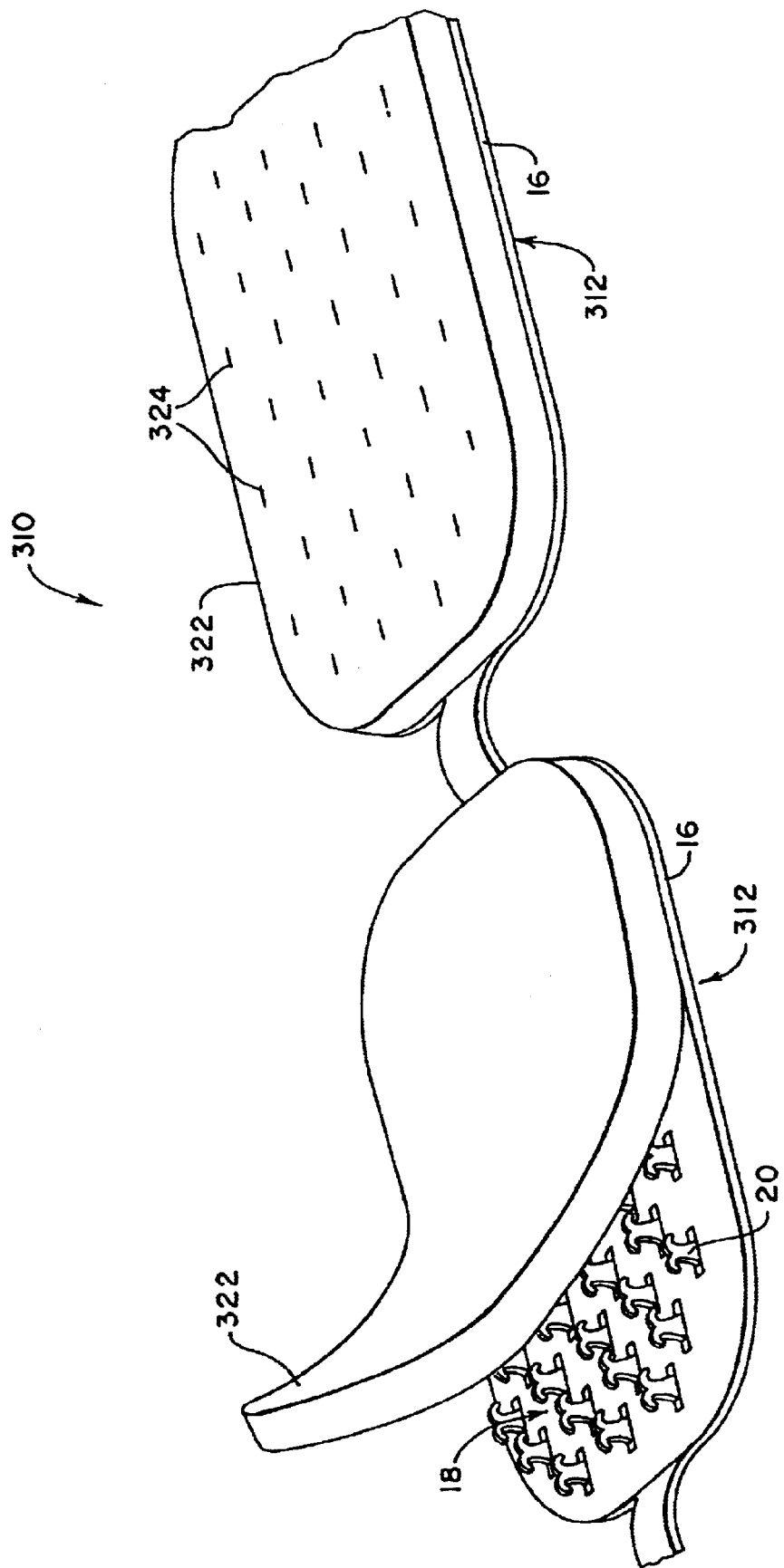
FIG. 7 is a schematic rendition of another embodiment of a fastener of the invention, in perspective view, the fastener having a space filling cover, with part of the cover broken away from one of the segments.

For another example, as shown in FIG. 7, a fastening strip 310, with individual fastening segments 312 is provided. This fastening strip is identical to that described above, except that it has no gasket 22 around its perimeter. It has segments 312 that are joined by a hinge 14, which segments and hinge may be formed as described above. The strip has a fastening face 18, which carries fastening elements 20, which are shown in FIG. 7 as hooks. Each segment is individually covered by a space filling cover 322, which intimately surrounds each fastening element 20 and fills the space therebetween, thus preventing the incursion of foaming material into the region where the fastening elements 20 reside, or the adherence of any foam thereto. After the fastening strip has been molded into a foam part, the cover 322 is removed, typically by ripping off the cover 322.

Similar covers are described in the literature, as applied to non-segmented fastening components. See for instance U.S. Pat. Nos. 5,286,431 and 5,540,970 in the name of Banfield et al. In the '431 patent, the space filling cover is generally described as fully encapsulating the fastening elements. In the '970 patent, the cover is described as, in some cases, allowing just the tips of the free end of the fastening elements to be exposed, through pinholes 324 in the cover as shown on the right hand segment in FIG. 7. The pinholes may facilitate removal of the cover, due to a reduction in any vacuum that might form. The space filling cover may extend all the way to the fastening surface 18 of the base 16, or it may be spaced away a small amount, as long as the amount of any foam that does intrude between the foam cover and the base is not so much as to prevent the fastening elements from accomplishing their fastening function.

Figure 8:
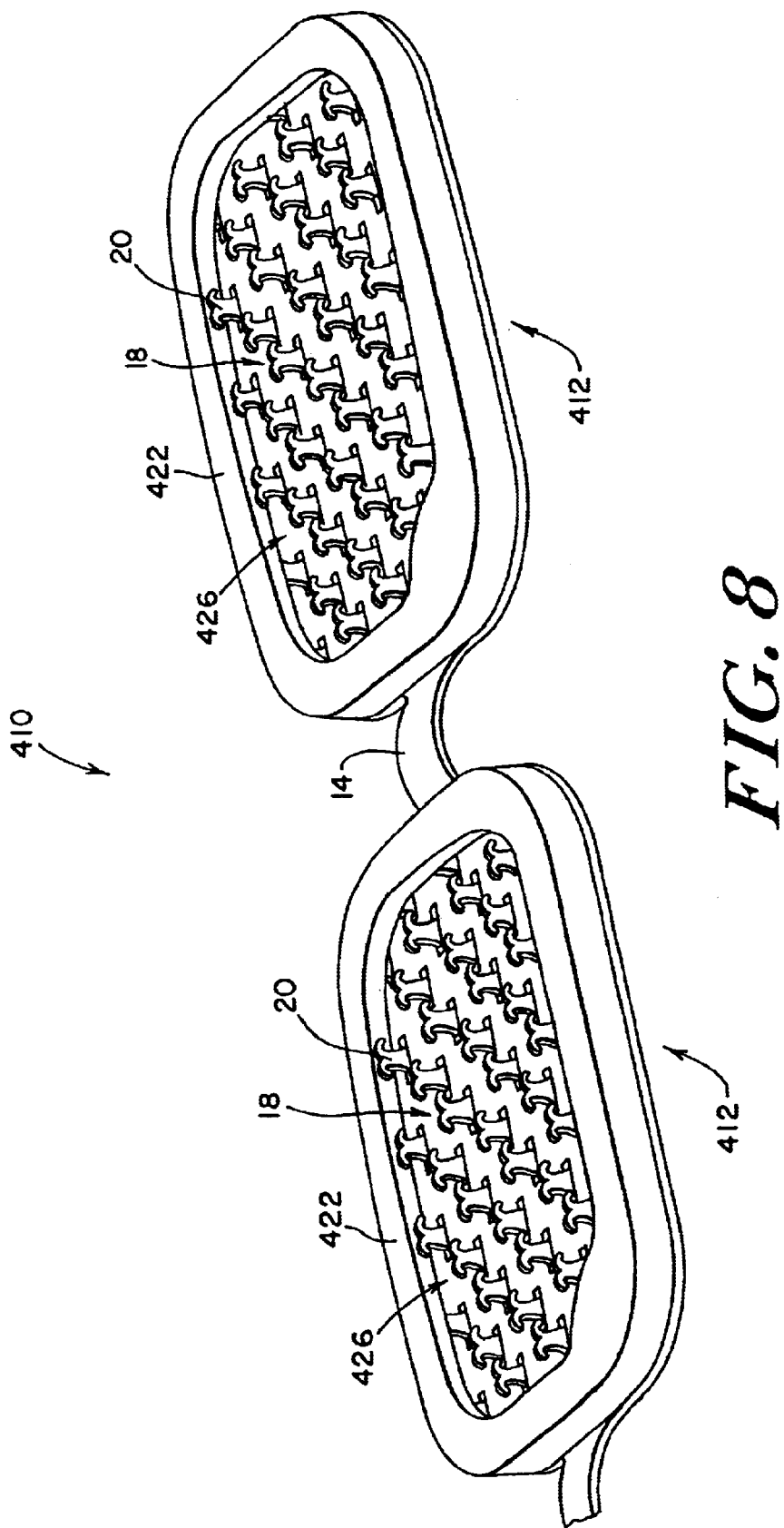
FIG. 8 is a schematic rendition of yet another embodiment of a fastener of the invention, in perspective view, the fastener having a space filling cover around the perimeter only.

For yet another embodiment, as shown in FIG. 8, a fastening strip 410, with individual fastening segments 412 is provided. This fastening strip is identical to that described above, except that it has no gasket 22 around its perimeter. It has segments 412 that are joined by a hinge 14, which segments and hinge may be formed as described above. The strip has a fastening face 18, which carries fastening elements 20, which are shown in FIG. 8 as hooks. Each segment is individually provided with a perimeter gasket in the form of a space filling cover 422, which intimately surrounds each fastening element 20 and fills the space therebetween that is positioned in the area upon which the cover is deposited. This cover functions in two modes. First, it serves as a barrier gasket, and prevents any foam from intruding into the central region 426. Furthermore, it protects those fastening elements in the perimeter that are actually covered by the gasket 422, in the same manner as the fully covering space filling cover 322 shown in FIG. 7. After the fastening strip has been molded into a foam part, the cover 422 is typically left on the fastener, and the fastening function is performed by the fasteners in the central region. Alternatively, it can be removed, typically by ripping off the cover 422.

Similar covers are described in the literature, as applied to non-segmented fastening components. See for instance the above referenced U.S. Pat. No. 5,786,061, inventor Banfield. As with the space filling cover, the perimeter gasket cover may fully encapsulate the fastening elements, or, it may allow just the tips of the free end of the fastening elements to be exposed, through pinholes.

Figure 9:
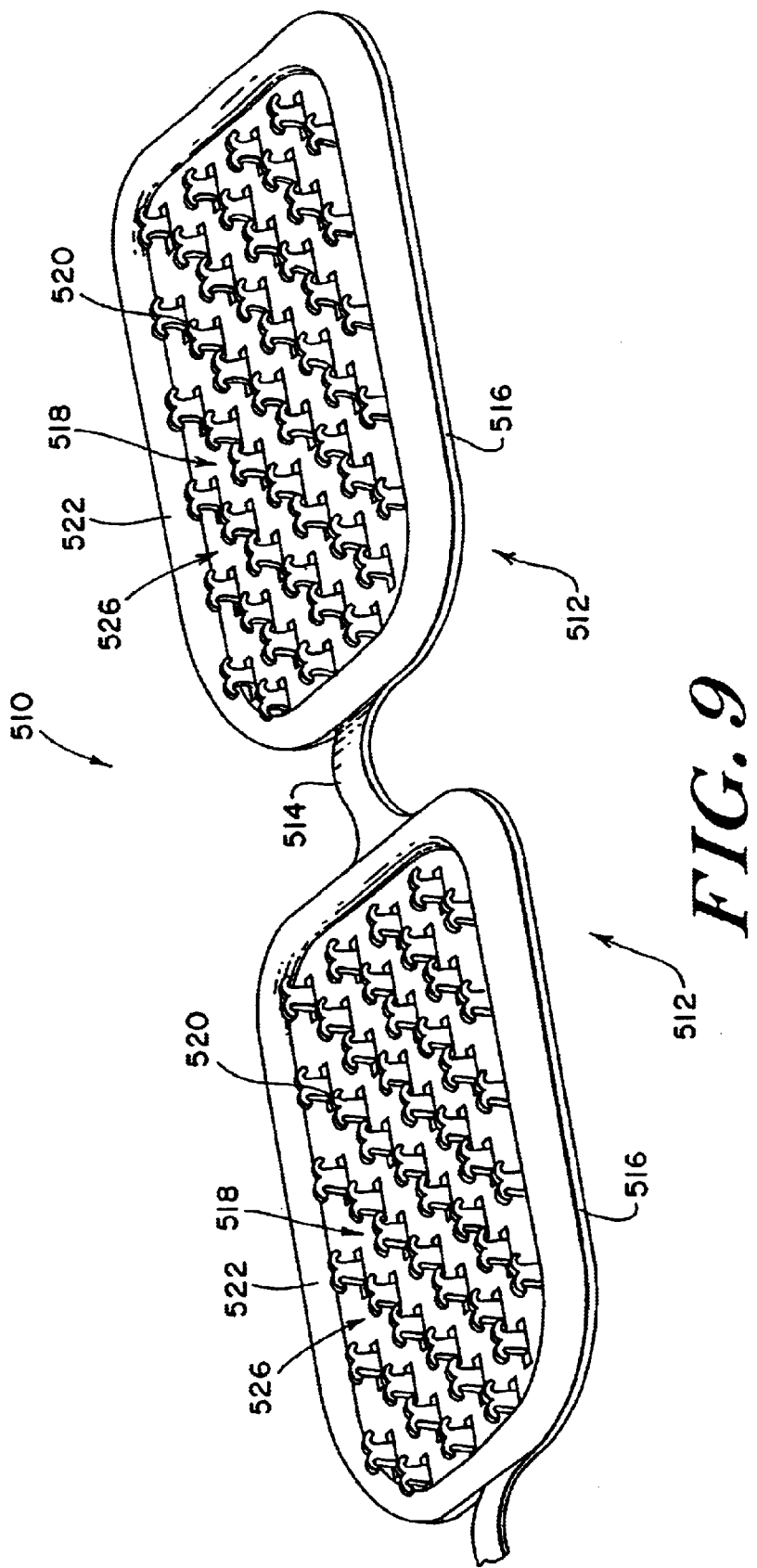
FIG. 9 is a schematic rendition of another embodiment of a fastener of the invention, in perspective view, the fastener having a perimeter gasket of a hot melt adhesive type.

Another variant of a perimeter gasket, is shown in FIG. 9, having a fastening strip 510, with individual fastening segments 512. This fastening strip is almost identical to that described above, except that it has no gasket 22 around its perimeter. It has segments 512 that are joined by a hinge 514, which segments and hinge may be formed as described above. The strip has a fastening face 518, which carries fastening elements 520, which are shown in FIG. 9 as hooks. Each segment is individually provided with a perimeter gasket in the form of a resilient gasket, which does not cover any fastening elements itself, but rather is applied to the base in a perimeter region that does not have any fastening elements. This gasket serves as a barrier gasket, and prevents any foam from intruding into the central region 526. After the fastening strip has been molded into a foam part, the gasket 522 is typically left on the fastener, and the fastening function is performed by the fasteners in the central region. Alternatively, it can be removed, typically by ripping off the gasket 522.

It is also possible to apply a gasket in the form of a film strip, all the way around each segment, similar to that shown in U.S. Pat. Nos. 4,814,036, and 4,726,975, inventor Hatch, identified above. Another type of gasket that can be applied around the gasket is an angled gasket, as shown in U.S. Pat. No. 4,842,916, inventor Ogawa, et al., assigned to Kuraray Company Ltd. Also shown in Ogawa '916 is a felt gasket. A foam gasket seal is shown in U.S. Pat. No. 5,766,723, issued on Jun. 16, 1998, inventor Oborny et al. The disclosures of all of the patents mentioned in this paragraph are hereby incorporated herein by reference.

Figure 11:
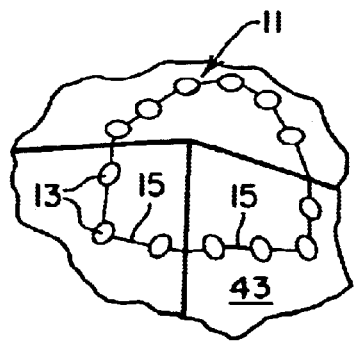
FIG. 11 is a schematic rendition in perspective view of a complementary fastener component, adhered to the inside of a corner of a flexible fabric cover, for attaching the cover to the molded body shown in FIG. 10.

The foregoing discussion has most frequently assumed that the segmented fastener will have some means for keeping foaming material from getting into the region of fastening elements, such as a perimeter seal, or a cover. However, the invention is not so limited, and its segmented fasteners alone, without any such barrier, are within the contemplation of the invention. Such fasteners could be used for applications where the fastener is not incorporated into a plastic body. For instance, as shown in FIG. 11, the mating portion 13 of a complementary fastener pair may advantageously be formed from a segmented strip. This allows the fastening component 11, for instance a loop component that is sewn or otherwise adhered to a flexible fabric seat trim cover 43, to be smoothly adhered to the seat cover, without buckling, or other restrictions on its location. In general, the seal is not required in that case. The individual segments 13 are connected by hinges 15, and thus can conform to the shape of the cover. FIG. 11 shows the inside of a three sided corner, in a schematic perspective view.

Further, if the hooks are chosen to be rather small and close together, no gasket is needed, as the hooks themselves prevent the influx of foam molding material.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A separable fastener component for use with a complementary separable fastener component, said separable fastener component comprising a continuous, integral strip, said strip comprising:

a. a plurality of fastening segments, each having a length along a length dimension and a width, along a width dimension that is perpendicular to said length dimension, arranged adjacent each other, along said length dimension, each fastening segment comprising:

i. a base member, having a nominal fastening face and a non-fastening face; and ii. carried on said fastening face of said base member, a plurality of fastening elements selected from the group consisting of hook-type fastening elements and loop fastening elements, said fastening elements carried by substantially all of said plurality of fastening segments being selected from only one member of said group; and b. located between and joining each adjacent pair of fastening segments, only one flexible neck, at approximately a midpoint of each segment width, that:
  i. is narrower than said fastening segment;
  ii. is integral with said base member of any adjacent segments; and
  iii. is substantially uniform in composition with said base member of any adjacent segments.

2. The fastener of claim 1, further comprising an enveloping cover, which substantially covers each said segmented fastening region.

3. The fastener of claim 1, said flexible neck region being flexible around three orthogonal axes.

4. The fastener of claim 1, further comprising, for each of said fastening segments, a barrier for use during an operation to incorporate said fastener into a molded body, using a mold having a wall, which barrier would prevent any liquid foaming material from contacting a major portion of any of said fastening elements if said fastener is placed in said mold with said fastening elements pressed against said wall of said mold.

5. The fastener of claim 4, said base comprising magnetically attractable material.

6. The fastener of claim 1, further comprising a removable space filling cover, which substantially fills any spaces among said fastening elements.

7. The fastener of claim 6, said fastening elements being hook-type elements, having free tips, said space filling cover leaving just said tips exposed to any such liquid.

8. The fastener of claim 6, said space filling cover comprising an elastomeric cover.

9. The fastener of claim 6, said space filling cover comprising a thermoplastic cover.

10. The fastener of claim 6, said space filling cover comprising a thermoset cover.

11. The fastener of claim 6, said space filling cover comprising a flexible cover.

12. The fastener of claim 1, further comprising, for each of said segmented fastening regions, a gasket that extends fully around the perimeter of said segmented region.

13. The fastener of claim 12, said gasket comprising a perimeter lip that has been integrally formed with said fastening elements.

14. The fastener of claim 12, said gasket comprising a perimeter lip that has been applied to said base member separately from said fastening elements.

15. The fastener of claim 12, said fastening elements comprising hook-type elements having free tips, said gasket comprising a flexible lip that extends away from said base slightly further than said tips.

16. The fastener of claim 12, said gasket comprising a perimeter space filling gasket that covers fastening elements in a perimeter region of said fastening segment.

17. The fastener of claims 12, said fastening segments comprising an internal region that carries said fastening elements and a perimeter region that carries no fastening elements, said gasket comprising a perimeter space filling gasket that covers said perimeter region that carries no fastening elements.

18. A molded polymeric body, said body comprising:
a. an internal body volume;
b. at least one surface;
c. a separable fastener component, adhered to said surface, said fastener component comprising a continuous integral strip, said strip comprising:
  i. a plurality of fastening segments, each having a length along a length dimension and a width, along a width dimension that is perpendicular to said length dimension, arranged adjacent each other, along said length dimension, each fastening segment comprising:
    A. a base member, having a nominal fastening face and a non-fastening face; and
    B. carried on said fastening face of said base member, a plurality of fastening elements selected from the group consisting of hook-type fastening elements and loop fastening elements, said fastening elements carried by substantially all of said plurality of fastening segments being selected from only one member of said group and extending away from said internal volume; and
  ii. located between and joining each adjacent pair of fastening segments, only one flexible neck, at approximately a midpoint of each segment width, that:
    A. is narrower than said fastening segment;
    B. is integral with said base member of any adjacent segments; and
    C. is substantially uniform in composition with said base member of any adjacent segments.

19. The molded polymeric body of claim 18, said separable fastener component further comprising, surrounding said fastening elements of each of said fastening segments, a perimeter gasket, which is unitary with said base member.

20. The molded polymeric body of claim 19, said gasket comprising a lip that extends from said base member at least as far as said fastening elements extend from said base member.

21. The molded polymeric body of claim 19, said fastener component being arranged such that segments of said fastener component are angled relative to each other, within a plane defined by said base members of said fastening segments.

* * * * *